United States Patent [19]
Llona et al.

[11] 3,946,281
[45] Mar. 23, 1976

[54] OVERCURRENT PROTECTION SYSTEM WITH VARIABLE INVERSE-TIME CHARACTERISTIC

[75] Inventors: Jesus Gomez Llona; Sabino de Bernedo Melendo, both of Munguia, Spain

[73] Assignee: Arteche, Instrumentacion Y Sistemas Electronicos, S.A., Munguia, Spain

[22] Filed: May 13, 1974

[21] Appl. No.: 469,540

[30] Foreign Application Priority Data
May 11, 1973 Spain .................................. 414664

[52] U.S. Cl. ..................... 317/36 TD; 317/148.5 B
[51] Int. Cl.² ......................................... H02H 3/08
[58] Field of Search ............ 317/36 TD, 14 B, 14 C, 317/148.5 R, 148.5 B

[56] References Cited
UNITED STATES PATENTS

| | | | |
|---|---|---|---|
| 3,327,171 | 6/1967 | Lipnitz et al. .................. | 317/36 TD |
| R25,762 | 4/1965 | Kotheimer ...................... | 317/36 TD |

*Primary Examiner*—A. D. Pellinen
*Attorney, Agent, or Firm*—Flynn & Frishauf

[57] ABSTRACT

An overcurrent protection system has an adjustable inverse-time characteristic which may be varied at will. The output of the inverse-time characteristic determining circuit is coupled to a variable timing means which is used to further shift by a predetermined time the inverse-time characteristic of the system, thereby providing a greater variety of possible switching characteristics. Further provided is an adjustable return-to-zero circuit which still further varies the characteristics of the protection system.

17 Claims, 4 Drawing Figures

OVERCURRENT PROTECTION SYSTEM WITH VARIABLE INVERSE-TIME CHARACTERISTIC

The present invention relates to protection systems, and more particularly to protection systems which protect apparatus from abnormal overcurrent conditions.

In order to protect power-supplied instruments from the dangers which might be occasioned by an abnormal overcurrent on the supply line, a number of current-sensitive relays are generally included in a protection network, which relays operate when the value of the line current exceeds a permitted level, thereby breaking the supply. Of these known relays, those which most effectively fulfil this protective mission are those generally having inverse-time characteristics. That is, their response time is not fixed, but is inversely proportional to the quantity of overcurrent, thereby acting quickly when the overcurrent is very high and assumes a high degree of risk, and operating more slowly with a proportional delay when the rise in current is insubstantial.

The prior systems using relays are bulky and generally consume relatively large amounts of power. Additionally, the relay systems are unreliable in use. Prior art electronic protection systems have been proposed, but these systems constantly draw power, thereby rendering them unsuitable for use in situations where it is undesirable to constantly supply power to a protection circuit. If the protection circuit uses batteries, or the like, the batteries are quickly drained and could possibly result in unreliable operation of the protection system.

The object of the present invention is to provide an improved electronic overcurrent protection system having an inverse-time characteristic which is widely variable to provide a high degree of flexibility and versatility to the protection system. A further object of the invention is to provide such a system in which current drain does not begin until the monitored current exceeds the "starting level" and causes tripping of the system.

SUMMARY OF THE INVENTION

According to the present invention, an overcurrent protection system includes an input means which samples the signal being monitored and which generates an output when the input signal thereto exceeds a given level. Further provided is a generator means responsive to the output of the input means and generating a signal after a predetermined period of time which is inversely proportional to the amplitude of the output of the input means, the generator means including a variable time constant circuit which is operable on a signal corresponding to the output signal of the input means for varying the inverse-time characteristic of the generator means. This changes the shape and positioning of the inverse-time characteristic relative to time. Also included is a variable timing means which is responsive to the signal generated by the generator means and which generates a trip signal which is a function of the variable time delay of the timing means. The variable time delay of the timing means is used to shift the previously determined inverse-time characteristics of the generator means by a predetermined time, thereby increasing the versatility of the system.

BRIEF DESCRIPTION OF THE DRAWING

FIG. 1A shows a modification of the circuit of FIG. 1;

DETAILED DESCRIPTION OF ILLUSTRATED EMBODIMENTS

Figure 1:
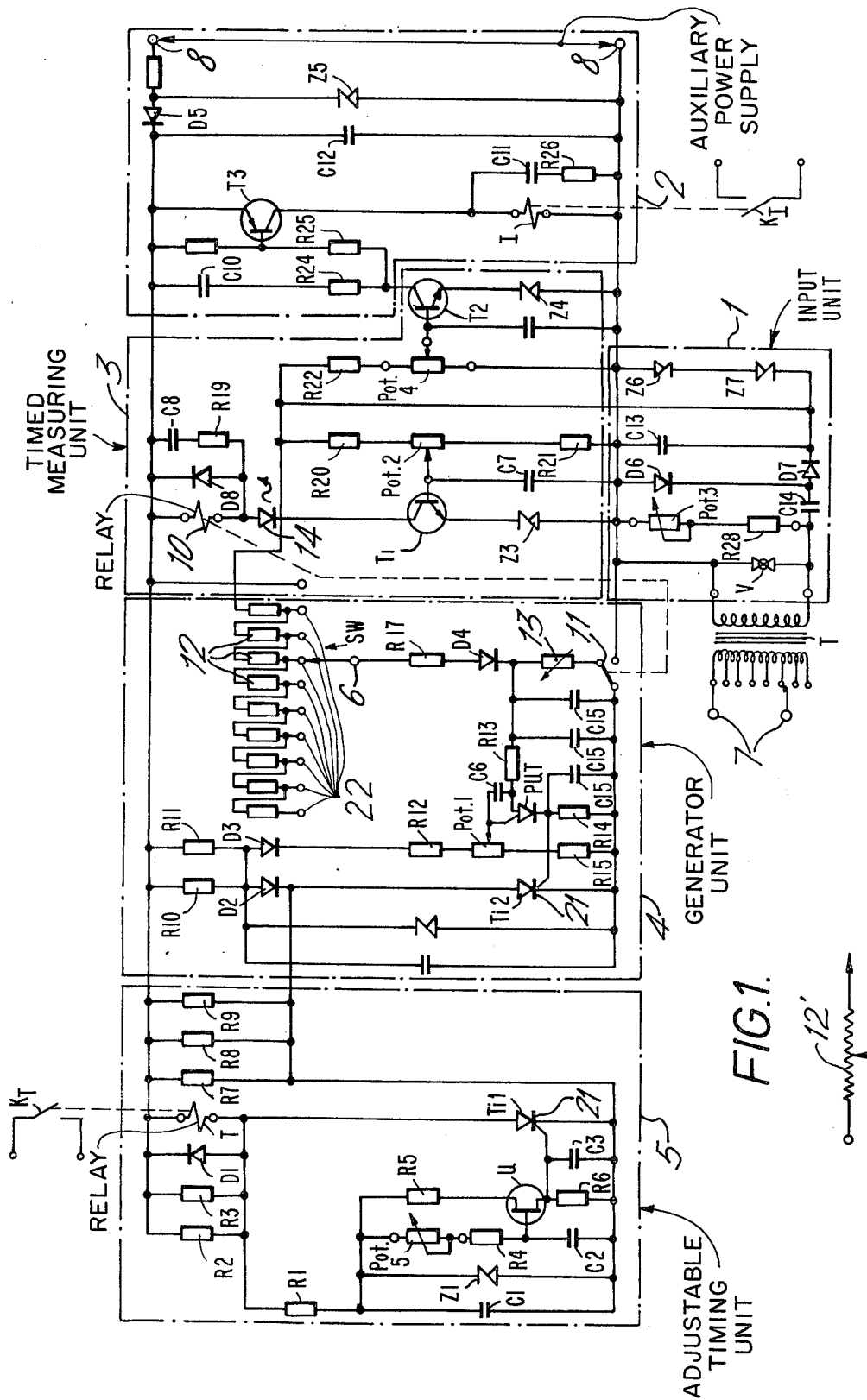
FIG. 1 is a circuit diagram of an embodiment of the present invention, each of these circuits installed on one phase of a monitored system to operate independently from those of the other phases.

The circuit depicted in FIG. 1 is installed on each of the line phases in a system in order to make the operation of each phase independent.

The system of FIG. 1 includes an input unit 1 having input terminals receiving the controlled signal from the terminals 7. The signal generated from terminals 7 is a sample signal comprising a sequence of half-cycles of the same polarity, each half-cycle being the sum of the one pertaining to the input signal plus the previous half-cycle taken from the same direction. Thus, the signal on terminals 7 is a quantitative sample of the input signal, but nevertheless does not reflect the possible asymmetrics which a mistripped relay might cause.

The system also includes a generator unit 4 for generating a "constant-time" function, referred to as an inverse-time characteristic curve 15 (FIG. 2) because it provides a trip-time which is inversely proportional to the overcurrent amplitude. To define the constant K of the "constant-time" function and consequently the curve 15 of FIG. 2, the generator unit 4 has a number of resistors 12 connected in series. A connection point 6 is provided which is variably connected to the resistors 12 by a multicontact switch SW which is operated by an external control (not shown) to include a variable number of the resistors 12 in the circuit, thus selecting one or other characteristic curve 15, having different K values, within the range provided by the resistor sequence. The fact that a combination of resistors 12 is provided rather than a variable rheostat enables greater accuracy in selection of a curve 15, thus allowing distribution of several of these systems at differing points in a line in order to effect a "stepped" type of control. FIG. 1A shows the plurality of resistors replaced by a variable resistor 12' which may have either a linear or a non-linear resistance characteristic.

Generation of a substantially straight-line characteristic 16 (FIG. 2) corresponds to when all resistors 12 are eliminated (or not connected), resulting in operation of a fixed-time relay (i.e., non-variable operation time), thus making the circuit usable in applications requiring this particular type of characteristic.

The system of FIG. 1 has an additional adjustable timing unit 5 which further retards tripping of relay T (having control contacts $K_T$) by an adjustable time period, in effect making a shift in the curves 15 relative to the time-axis (ordinate in FIG. 2), thereby converting the curves 15 into other characteristic curves 17 to endow the system with even greater versatility and flexibility.

To adjust the "return-to-zero" time of the generator unit 4 the generator 4 includes an adjustable resistor 13. This enables adjustment of the circuit so that the timer output "returns-to-zero" in a given time, which may be before a transient starting signal 18 (FIG. 3) which does not reach trip-timing starts again. Resistor 13 is adjustable to obtain a slow return (curve 19 – FIG. 3) resulting in the previous start signal pulse of signal 18 influencing the timing of the circuit when the next pulse of signal 18 appears. Resistor 13 may be adjusted for rapid return (curve 20 – FIG. 3) which occurs before the occurrence of the next successive overcurrent pulse, thus cancelling the influence which the previous overcurrent pulse of signal 18 might have caused.

The system also optionally has a light-transmission diode system 14 wired to visually signal the start of the timed measuring unit 3.

So that the system does not put a drain on the auxiliary system 8 the input portion of the circuit arrangement includes a supplementary transistor circuit 2 which draws no power until a starting value occurs which causes tripping of relay I. Further, the generator unit 4 does not drain power during the stand-by condition because its negative switchpole (11) is kept opened until relay 10 is activated when that starting level is reached. Still further, the timing unit 5 does not drain power during stand-by inasmuch as its negative connection is via the thyristors 21, which are only excited when the time matching the selected "constant-time" current characteristic has been attained.

Replacement of the resistors 12 by non-linear elements selected according to delay use is contemplated as this may result in the obtainment of other desired protection characteristics.

Differing from those protection systems already in existence, the system of FIG. 1 does not drain current from the auxiliary power supply system until the starting level (i.e., "overcurrent level") causes tripping of the circuit. As the irregularity occasioning starting of tripping is normally going to occur on only a very few occasions, then current drain occurs only at these "danger" times and is consequently minimal. This enables the present invention to make use of a simple precharged capacitor feasible as an auxiliary power source. On the other hand the use of such a simple source of power is forbidden in the prior art electronic relay systems because they are draining current at all times, even in the "stand-by" condition. Thus, the prior art systems must utilize other costly and bulky auxiliary power sources, such as batteries.

The generator unit 4 generating the current function for a period of time equal to constant (i.e., the "inverse-time" characteristic curve), is arranged to create a multiplicity of these functions inter alia the fixed-time function, thereby making possible the choice of the most appropriate inverse-time characteristic at any time, or for application, by means of an easily accessible control to vary the resistors 12 connected in the circuit. This adjustment can be made even while the system is in service, thus enabling converting the system with variable inverse-time characteristic into a fixed-time relay system, at will.

By means of another control controlling for example the variable resistor in the adjustable timing unit 5, the chosen characteristic curve (chosen by resistors 12) can be shifted by a specified period of time. This adds further flexibility and this control can also be adjusted even while the system is in service.

The combination of the last two adjustment features serves to endow the system of the present invention with a versatility and capability of application on any service-system providing the specific variable retard-time which the user believes most advantageous. In addition it enables several of these mutually similar but differently rated systems to control different points in a service-system, exercising selective control, accurately stepped, at each point of the lines in a monitored system. This versatility contrasts with that of the earlier systems inasmuch as when arranged to create a family of curves without shift of time constant they are positively restricted to their application at a pre-established point (i.e., to have only fixed or restricted control characteristics on an also pre-established line. This reduces the number of different types of control units needed in an overall protection system since each unit is fully adjustable. Also, a reduced number of spares need be kept for replacement purposes.

The return-to-zero time of the generator unit 4 can be adjusted in the system of the present invention before the occurrence of a start not reaching trip-timing and tripping does not occur. Regulation of the influence of already extinguished overcurrents within the system before the occurrence of another overcurrent is accomplished with this control, because if the return-to-zero has been adjusted for this to occur in the interval between one and another overcurrent, the influence of those overcurrents which previously occurred is null and void. This independence of the overcurrent thus achieves selective operation or "stepping" of the systems installed at various selected points on a line. However, if when an overcurrent occurs the generator unit 4 has been adjusted for a long return-to-zero time, the time required to return-to-zero does influence response time, shortening it and thus obtaining system operation similar to operation of systems using protective thermal devices, in which the heat creates an overcurrent, which added to a previous overcurrent has not had time to dissipate.

The internal constituents of the various units of the present invention operate in conventional manners and a detailed description of each component, and the specific operation thereof, is given below.

DISCUSSION OF CIRCUITRY

Unit 1 - for conditioning of the signal and supression of the aperiodic effect

Unit 2 - for measuring the second screening and its output relay, also called "instantaneous unit"

Unit 3 - threshold unit of the system of inversed timing

Unit 4 - Unit for obtaining the characteristic curve

Unit 5 - Unit of additional timing and including a timed output relay.

OPERATIONAL DESCRIPTION

Unit 1:

The secondary of transformer T at the input is protected by a varistor V and provides a secondary voltage which by means of a voltage divider Pot. 3, which serves as a "fine adjustment", and of a resistor R28, is transformed to a voltage which is rectified by the diodes D6 and D7. The asymetrical component of this voltage is removed by the capacitors C13 and C14, and is then supplied to the units 2 and 3. The Zener diodes Z6 and Z7 limit the highest obtainable voltage amplitude at the output of unit 1 to a fixed vlaue so that the output voltage is constant when the level of input to terminals 7 surpasses a predetermined value relative to the adjusted voltage level.

Figure 2:
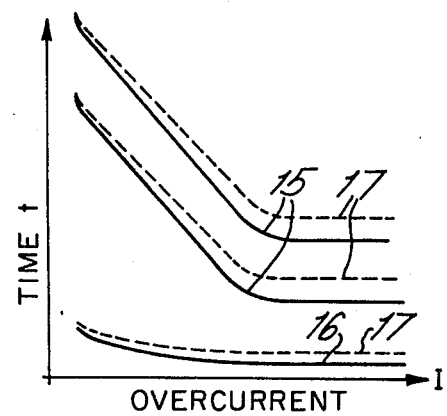
FIG. 2 is a graph illustrating operational characteristics of the invention.

This proportions a constant time zone for elevated voltage levels, as is being evaluated in FIG. 2 and in the portion situated to the right from the curves.

Unit 2:

The pulsating voltage obtained from Unit 1, is coupled to Unit 2 via a voltage divider formed by R22, Pot. 4 and transistor T2. The potentiometer Pot. 4 is a "second screening and adjustment," and is adjusted to obtain a voltage higher than the sum of the base-emitter of the transistor T2 and the voltage of the Zener diode Z4, when the input voltage level at the primary 7 of the input transformer T is in the order of twice the nominal value.

Under these conditions, the transistor T2 will conduct commuting across resistor R25 to the transistor T3 which becomes conductive and excites the relay (I) by applying voltage across its winding. Resistor R24 and capacitor C10, as well as resistor R26 and capacitor C11, form connected integrators of the pulsating signal to prevent vibration or chattering of the contacts of relay (I).

Unit 3:

The output voltage of Unit 1 is also supplied to Unit 3 which is the threshold unit of the timed element, through the voltage divider formed by resistances R20, R21 and potentiometer Pot. 2 which couples the signal to the base of the transistor T1.

When the voltage level which circulates through the primary of the input transformer T is higher than the adjusted threshold intensity, the voltage appearing at the base of the transistor (T1) is higher than the voltage drop of the Zener diode Z3, whereby transistor T1 begins to conduct, exciting the relay 10 and illuminating the light emitting diode 14. Excitation of relay 10 causes operation of its switching contacts 11 which are in Unit 4.

The relay 10 may be designated "the threshold relay" and has connected in parallel to its coil a diode D8 and the series combination of a resistor R19 and a capacitor C8 serving to integrate the conduction pulses of the transistor T1.

Unit 4:

The switching of the contacts 11 of relay 10 permits application of the voltage generated in Unit 1 to Unit 4. In Unit 4, this voltage is applied through a circuit formed by a plurality of resistances 12, a multi-contact switch SW, a resistance R17, a diode D4, capacitors C15, relay contacts 11 to the negative voltage terminal of Unit 1. This voltage charges the capacitors C15 which, on arriving to a certain charged voltage level determined by the divider D3, R12, Pot. 1, R15 and through the triggerable transistor PUT, are rapidly discharged across the resistance R14. This discharging causes ignition of the thyristor Ti2 which ignites and remains conductive through R10, R11, D2, and Ti2.

The time necessary for reaching the discharge level of the transistor unit (Put) depends on the time constant RC selected by means of the switch SW. That is, by means of the switch SW it is possible to select the curve (intensity-time) appropriate for the element being protected.

When the voltage level at the primary 7 of the input transformer T decreases beneath the set threshold value prior to the capacitors 15 reaching the discharge level, the capacitors discharge across the resistance 13, and causing the inverting relay contacts 11 of relay 11 to return to its rest position which is the position shown in FIG. 1. The selection of the value of the resistance 13 allows a quick discharge characteristic to be obtained. Alternatively, where the discharge proceeds very slowly, which may be obtained by chosing a very high value for resistor 13, it is attainable to have a cummulative effect of the overcharge.

Unit 5:

This is a unit which provides an additional timing or delay to the signal received from Unit 4.

When conducting, the thyristor Ti2 within said Unit 4 causes the auxiliary voltage appearing at terminals 8 to be applied across the resistances R7, R8, R9. A constant voltage thus appears across the circuit formed by parallel resistors R2, 23, diode D1 and relay T1, which parallel circuit is in series with resistor R1 which in turn is in series with Zener diode Z1. This constant voltage serves for charging the capacitor C2 across the resistance R4 and the potentiometer Pot. 5, which serves for selecting the additional time constant. The capacitor C2 reaches a voltage capable of actuating the unijunction transistor U, discharging itself to the capacitor C3 across the resistance R6, thus causing igniting of the thyristor Ti1 which then excites the relay T and short circuits the rest of the elements of the timing unit. The relay T through its contacts KT gives an order indicating an excess in the voltage level, over the pre-set voltage level, in the primary 7 of the transformer T of input Unit 1.

Figure 3:
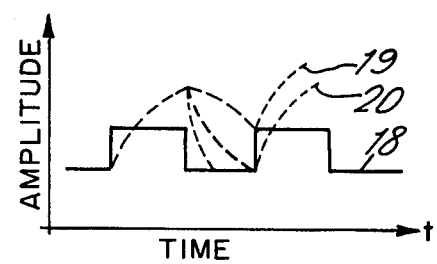
FIG. 3 depicts the return-to-zero time influence of the generator before successive starts of insufficient duration.

FIG. 3 has the coordinate axes time and the voltage amplitude charging capacitor C15. The line 18 in FIG. 3 represents the general voltage for the voltage to be measured exceeding the threshold value in certain periods. The dashed lines 19 and 20 show in the ascending phase the voltage on the capacitors C15 across the resistances 12. The discharge curves, i.e., the descend portions of curves 19, 20, correspond to the discharge of the capacitors C15 across the resistor 13. The relay quasi instantaneously returns to the rest position to effect inversion of the contacts 11, which characteristic is shown in the dashed curve 20 of FIG. 3. The curve (19) shows the cummulative effect obtained by elevation of the value of the resistance 13.

While the invention was described above with respect to specific apparatus, it should be clear that various modifications and alterations may be made within the inventive concept, as set forth in the claims. For example, while mechanical relays are shown in certain parts of the circuitry, it should be clear that they could be replaced by, for example, semiconductor switching circuits. Additionally, while various specific types of timing circuits are shown, equivalent timing circuits, but perhaps having different internal constructions, could be used.

We claim:

1. An overcurrent protection system for protecting an electrical system, comprising:
input means (1) having an input (7) for obtaining a sample of a time-varying electrical signal from the electrical system being protected and for generating a time-varying output when the input signal to said input means (1) exceeds a given value;
generator means (3, 4) coupled to said input means (1) for selectively generating a first trip signal either immediately after receipt of the output of said input means (1) or after a first predetermined time has elapsed after receipt of the output of said input means (1), said first predetermined time being inversely proportional to the amplitude of the output of said input means (1), said generator means (3, 4) including a variable time constant means (6, 12) operating on a signal corresponding to said output signal of said input means (1) for varying the inverse-time characteristic of said generator means;

variable timing means (5) responsive to said first trip signal generated by said generator means (3, 4) for generating a second trip signal after a second predetermined time elapses after receipt of said first trip signal, thereby shifting in time the inverse-time characteristic of said generator means; and means responsive to said second trip signal for indicating that said input to said input means (1) has exceeded said given value.

2. A system according to claim 1 wherein said variable time constant means includes a capacitor means coupled to a variable resistance means, the time constant being varied by varying the resistance of said variable resistance means.

3. A system according to claim 2 wherein said variable resistance means includes a plurality of resistors coupled together and means for coupling selective ones of said resistors to said capacitor means.

4. A system according to claim 3 wherein said plurality of resistors are series connected.

5. A system according to claim 2 wherein said variable resistance means includes a variable resistor.

6. A system according to claim 5 wherein said variable resistor has a non-linear resistance characteristic.

7. A system according to claim 1 wherein said generator means further includes means for bypassing said variable time constant means so as to provide a constant time delay operation of the protection system.

8. A system according to claim 1 comprising means coupling said input means, generator means and variable timing means to a source of power, said coupling means including means responsive to the output of said input means for selectively coupling said source of power to said generator means and variable timing means, and isolating said source of power during stand-by conditions.

9. A system according to claim 8 wherein said coupling means includes a relay and associated contact coupling said source of power to said generator unit.

10. A system according to claim 8 wherein said coupling means include a thyristor means coupling power to said adjustable timing unit when said first trip signal is generated by said generator means.

11. A system according to claim 1 wherein said generator means further comprises means for adjusting the return-to-zero time of said variable time constant means.

12. A system according to claim 11 wherein said return-to-zero adjusting means comprises a variable resistor coupled to said variable time constant means.

13. A system according to claim 12 wherein said variable time constant means includes a capacitor, said variable resistor being selectively coupled to said capacitor to discharge same, thereby returning said variable time constant means to zero.

14. A system according to claim 1 wherein said input means includes means for sampling a sequence of half-cycles of the input signal, the output signal of said input means including successive signals which are the absolute sum of a given half-cycle of the input signal and of the preceding half-cycle.

15. A system according to claim 1 wherein said generator means includes means for visually indicating when the input signal exceeds a given level, thereby indicating starting of a timing operation.

16. A system according to claim 15 wherein said indicating means is a light-transmission diode.

17. A system according to claim 8 including means rendering said coupling means responsive to a different time-portion of said time-varying output of said input means than said generator means.

* * * * *